United States Patent
Kawakubo

(10) Patent No.: US 7,089,435 B2
(45) Date of Patent: Aug. 8, 2006

(54) STORAGE UNIT HAVING NORMAL AND BACKUP POWER SOURCES FOR USE IN RETAINING DATA WHEN NORMAL POWER FAILS

(75) Inventor: Yosuke Kawakubo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 10/820,129

(22) Filed: Apr. 8, 2004

(65) Prior Publication Data

US 2005/0182991 A1    Aug. 18, 2005

(30) Foreign Application Priority Data

Feb. 16, 2004    (JP) ............................. 2004-038599

(51) Int. Cl.
*G06F 1/26* (2006.01)
(52) U.S. Cl. ...................................... 713/300; 365/229
(58) Field of Classification Search ................ 365/229; 713/300
See application file for complete search history.

(56) References Cited

U.S. PATENT DOCUMENTS

| | | | | |
|---|---|---|---|---|
| 5,204,963 A | * | 4/1993 | Noya et al. ................. | 365/229 |
| 5,341,493 A | | 8/1994 | Yanai et al. | |
| 5,359,569 A | * | 10/1994 | Fujita et al. ................ | 365/229 |
| 5,414,861 A | | 5/1995 | Horning | |
| 5,519,831 A | * | 5/1996 | Holzhammer ................. | 714/22 |
| 5,784,548 A | * | 7/1998 | Liong et al. ................... | 714/6 |
| 5,828,823 A | * | 10/1998 | Byers et al. .................. | 714/24 |
| 5,905,994 A | | 5/1999 | Hori et al. | |

FOREIGN PATENT DOCUMENTS

JP    2001-290608    10/2001

* cited by examiner

*Primary Examiner*—Chun Cao
*Assistant Examiner*—Hari Patel
(74) *Attorney, Agent, or Firm*—Mattingly, Stanger, Malur & Brundidge, P.C.

(57) ABSTRACT

A feeding technique for a storage unit is provided, in which power can be supplied from an optimum power source depending on an operation mode of a cache memory, the stable switching of feeding paths can be performed, and the feeding with high voltage accuracy and small voltage variation can be achieved. For its achievement, the feeding system in the RAID system including a hard disk drive, a disk adaptor, a channel adaptor, and a cache memory is provided. The feeding system includes a DC-DC power source to supply, to the cache memory, the voltage for a normal operation mode in which the data is written/read to/from the cache memory, and a DC-DC power source to supply, to the cache memory, the voltage for a backup operation mode in which the data stored in the cache memory is retained, and the power sources are switched during the feeding depending on the operation mode of the cache memory.

10 Claims, 9 Drawing Sheets

LOAD CURRENT

OUTPUT VOLTAGE

LOAD CURRENT

OUTPUT VOLTAGE

OUTPUT VOLTAGE

STORAGE UNIT HAVING NORMAL AND BACKUP POWER SOURCES FOR USE IN RETAINING DATA WHEN NORMAL POWER FAILS

CROSS-REFERENCE TO RELATED APPLICATION

The present application claims priority from Japanese patent application No. JP 2004-038599 filed on Feb. 16, 2004, the content of which is hereby incorporated by reference into this application.

BACKGROUND OF THE INVENTION

The present invention relates to a storage unit and, particularly, to a technique effectively applied to a feeding technique for a RAID (Redundant Array of Inexpensive Disk) system in which storage devices are arrayed so as to have redundancy.

According to the examination by the inventor of this invention, the techniques as follows are known in the conventional RAID system and the feeding technique for the RAID system.

The conventional RAID system examined by the present inventor comprises: a hard disk drive for storing data; a disk adaptor for controlling the writing/reading of data to/from the hard disk drive; a channel adaptor for controlling an interface with a host CPU; a cache memory for temporarily storing the data written/read between the host CPU and the hard disk drive; a cache switch for shifting the writing/reading of data to the cache memory; a shared memory for storing configuration information of the entire unit and information for managing the progress of operation; an AC-DC power source, a DC-DC power source, and a battery for a feeding system; and the like.

In this conventional RAID system, the writing data from the host CPU is once written to the cache memory and then stored in the hard disk drive. At this time, it is unnecessary to immediately write, to the hard disk drive, the data stored in the cache memory, and the writing may be done depending on operational conditions of the RAID system. Even if the data writing from the cache memory to the hard disk drive is not done, the data temporarily stored in the cache memory from the host CPU may be accessed. Furthermore, there is an advantage of the fact that since an access speed of the cache memory is faster than that of the hard disk drive, a high-speed data access can be done from the host CPU. In the RAID system, the cache memory with larger capacity is more preferable from the viewpoint of the data access performance.

Therefore, the conventional RAID system uses a large number of DRAMs (Dynamic Random Access Memories) because the DRAM has the large memory capacity and is effective in cost. The DRAM used for the cache memory is inferior to a SRAM (Static Random Access Memory) in the access speed, but is advantageous in memory capacity and the cost. Also, the DRAM is advantageous over the flash memory in both of the cost and storage capacity. In contrast, since the DRAM is a volatile memory, it is necessary to always supply a power source voltage in order to store (retain) the data and also a refresh operation (regular recharging operation for the inner capacitor) unique to the DRAM is indispensable.

As described above, since the DRAM is a volatile memory, when power failures such as blackouts occur under the condition that the data in the cache memory is not yet stored in the hard disk drive, the data in the cache memory (data not yet written in the hard disk drive) is volatilized (data lost) due to the stop of the feeding to the cache memory. Therefore, the function to prevent the volatilization of the data in the cache memory, for example, the function to switch the power source to the battery power source and continue the feeding to the cache memory during the blackout is needed in the power source feeding system of the RAID.

For example, from the viewpoint of the reliability of the stored data, it is essentially desirable that the system is stopped after the data not yet written to the hard disk drive in the cache memory is stored into the hard disk drive even when the power failures such as the blackouts occur. However, a high-cost power system such as UPS (Uninterruptable Power Supply) is required for its achievement.

Therefore, in the conventional system, a battery backup system for the cache memory data is adopted as a method of preventing data loss at low cost. In this battery backup system, the battery is used only for the feeding to the cache memory during the blackout failures, and once the cache memory (DRAM) is switched to the backup operation mode, the data access is inhibited and the power consumption thereof is reduced. Accordingly, the low-cost lead storage battery can sufficiently cover the battery performance and the power capacity. Also, the system may be used even in a mounting space capable of mounting on a device.

As described above, the feeding system in the conventional RAID system examined by the inventor uses, for example, a feeding path as described in a document of Japanese Patent Laid-Open No. 2001-290608. More specifically, the document discloses a technique provided with two systems such as a normal feeding system in which the AC voltage of commercial power source is converted to the DC voltage and the converted DC voltage is converted to a voltage necessary for the normal operation of the cache memory and the converted voltage is supplied to the cache memory, and a battery feeding system, employed at the time of occurrence of the power failures such as the blackouts, in which a voltage of the battery is converted to the minimum voltage necessary for the backup operation of the cache memory and the converted voltage is supplied to the cache memory.

As a result of the examination by the inventor about the feeding system of the conventional RAID system, the followings have been shown.

For example, the feeding system in the conventional RAID system examined by the inventor has a configuration as shown in FIG. 9. An example of the configuration and operation of the feeding system in the conventional RAID system examined by the inventor will be described with reference to FIG. 9.

As shown in FIG. 9, a feeding system 61 in the conventional RAID system examined by the inventor is connected to a host CPU 2 and a commercial power source 3 and is composed of: a cache memory (CACHE) 62; a hard disk drive (HDD) 11; a disk adaptor (DKA) 12; a channel adaptor (CHA) 13; a cache switch (CSW) 15; AC-DC power sources (1) 63 to (4) 66; a battery 67; DC-DC power sources (1) 68 and (2) 69; and the like.

In the configuration of this feeding system 61, the path from the AC-DC power source (2) 64 through the switch (SW1) to the memory 71 and the path from the battery 67 through the DC-DC power source (2) 69 and the switch (SW2) to the memory 71 are provided. The former is the feeding system for the normal operation mode and the latter is the feeding system for the backup operation mode. In addition, the power from the AC-DC power source (1) 63 is supplied to the cache memory 62, the disk adaptor 12, the channel adaptor 13, and the cache switch 15, and the power from the AC-DC power source (4) 66 is supplied to the hard disk drive 11. Note that the battery 67 is always charged through the AC-DC power source (3) 65 and the DC-DC power source (1) 68.

In the above-described feeding system 61, the AC-DC power sources (1) 63 to (4) 66 are usually used to supply the power to the whole RAID system, and the AC-DC power source (2) 64 is usually used to supply the power to the cache memory 62. In this case, the switch (SW1) is in a turn-on state. When the blackout occurs in this state, the AC-DC power sources (1) 63 to (4) 66 are stopped. However, a power source switching control circuit 72 turns on the switch (SW2) simultaneously with the detection of the reduction in output voltages of the AC-DC power source (2) 64, and the power is temporarily supplied from both of the battery 67 (DC-DC power source (2) 69) and the AC-DC power source (2) 64. Then, the switch (SW1) is turned off and finally the feeding path is completely switched to that from the battery 67. Therefore, the feeding to the cache memory 62 is not stopped, and loss of the data not yet written to the hard disk drive 11 is not generated.

However, since the operation voltage of the DRAM of the memory 71 used in the cache memory 62 is, for example, 3.3 V±10% in the above-described feeding system 61, the switching of the feeding path is started when the output voltage of the AC-DC power source (2) 64 is reduced to, for example, 3.3 V−7%. In this switching of the feeding path, it is necessary that the mode of the cache memory 62 is changed to the backup operation mode to reduce current consumption to a level adequate to the feeding ability of the battery 67 in a short time when the feeding voltage is reduced from −7% to −10% (μS order). Therefore, in the conventional feeding system 61, it is necessary to adopt a highly sensitive circuit configuration, as a series of control circuits used to monitor the feeding voltage and switch the feeding path, and thus the mounting technique to cope with such an external factor as noise is indispensable.

Also, in the conventional feeding system 61, when the instantaneous blackout beyond the endurance of the AC-DC power sources (1) 63 to (4) 66 occurs, the cache memory 62 is inevitably turned into the backup operation mode (in the state where the cache memory 62 cannot be used). Therefore, the operation of the device is substantially stopped though the data loss is not generated. For its recovery, the assist of engineers is necessary. As described above, the feeding system 61 in the conventional RAID system leaves room to be improved in the endurance for blackout.

The problems as shown above can be solved by the improvement of the endurance for instantaneous blackout of the feeding system, and if the endurance for instantaneous blackout can be improved, the data in the cache memory can be stored also into the hard disk drive (destaging process) even at the time of the blackout or the instantaneous blackout. As a result, it becomes possible to establish the RAID system with higher reliability. However, it is thought that the data backup of the cache memory is still necessary even if the endurance for blackout is improved and a destaging process thereof can be performed. This is because there is the possibility of exceeding the endurance limit for blackout when the data storage process is repeatedly performed due to the failure of the hard disk drive during the is destaging process. Therefore, it is necessary to switch the destaging process to the data backup process for the data in the cache memory in such a case.

SUMMARY OF THE INVENTION

Therefore, an object of the present invention is to provide a feeding technique for a storage unit such as the RAID system, by which the power can be supplied from an optimum power source depending on the operation mode of the cache memory, especially the feeding paths can be stably switched, and the feeding with high voltage accuracy and small voltage variation can be achieved.

More concretely, the present invention provides the system configuration in which the feeding path of the power source dedicated to the normal operation mode of the cache memory and the feeding path of the power source dedicated to the backup operation mode of the cache memory are switched during the feeding, whereby the switching method of the feeding paths using the low-cost normal power sources and capable of preventing a prebias phenomenon can be achieved without using the diode-OR circuit.

The above and other objects and novel characteristics of the present invention will be apparent from the description of this specification and the accompanying drawings.

The typical ones of the inventions disclosed in this application will be briefly described as follows.

The present invention can be applied to a storage unit comprising: a storage device to store data; a storage device control section to control the writing/reading of the data to/from the storage device; a channel control section to control an interface with a host machine; and a cache memory to temporarily store the data written/read between the host machine and the storage device, and the storage unit has the characteristics as follows.

(1) The storage unit comprises: a first power source to supply, to the cache memory, a voltage for a normal operation mode in which the data is written to/read from the cache memory; and a second power source to supply, to the cache memory, voltage for a backup operation mode in which the data stored in the cache memory is retained. More specifically, in the normal operation mode, the power is supplied from the power source dedicated to the memory normal operation mode, and in the backup operation mode, the power is supplied from the power source dedicated to the memory backup operation mode. In this manner, it is possible to supply the power from the optimum power source depending on the operation mode of the cache memory.

(2) Each of the first and second power sources further includes: a function to change its own output voltage in response to a command from the outside of a power source, and control means to switch a feeding path of the first power source to the cache memory and a feeding path of the second power source to the cache memory, wherein, in switching the control means, the control means switches the feeding paths to the cache memory by controlling such a voltage value that an output voltage of one selected from the second and first power sources is set higher than that of the other unselected from the second and first power sources. More specifically, the output voltage of the selected power source is controlled to be relatively higher than that of the unselected power source, whereby the operation of the selected power source is be prevented from stopping. In this manner, it is possible to perform the stable switching of the feeding paths, and also to realize the feeding operation with high voltage accuracy and small voltage variation.

(3) The storage unit further comprises first connection means connected to the input side of the first power source, and when the power is supplied from the second power source, the first connection means is turned off. More specifically, when the power is supplied from the power source dedicated to the memory backup operation mode, the switch provided on the input side of the power source dedicated to the memory normal operation mode is turned off and the operation of the power source dedicated to the memory normal operation mode is stopped. By so doing, it is possible to reduce the current consumption of the battery in the backup operation mode and also to reduce the battery capacity.

(4) The storage unit comprises: second connection means connected between the output terminal of the second power source and the feeding terminal of the cache memory; and monitoring means to monitor the output voltage of the second power source, wherein when the power is supplied from the first power source, the second connection means is turned off and the output voltage of the second power source is monitored by the monitoring means. More specifically, when the power is supplied from the power source dedicated to the memory normal operation mode, the switch provided between the output of the power source dedicated to the memory backup operation mode and the feeding terminal of the cache memory is turned off and the output voltage of the power source dedicated to the memory backup operation mode is monitored by the monitoring circuit. By so doing, it is possible to prevent the data loss of the cache memory in advance and also to improve the reliability of the data.

(5) The first power source is the fast-response DC-DC converter, and the second power source is the highly power-efficient DC-DC converter. More specifically, the fast-response DC-DC converter is used as the power source dedicated to the memory normal operation mode and the highly power-efficient DC-DC converter is used as the power source dedicated to the memory backup operation mode. By so doing, since the fast-response power source dedicated to the memory normal operation mode is used to supply the power in the self refresh in the normal operation mode and in the rapid current change in the intensive refresh, the feeding to the cache memory can be stably performed with small voltage variation. Also, in the case where the small current is supplied in the backup operation mode, the highly power-efficient power source dedicated to the memory backup operation mode is used to supply the power. Therefore, the power consumption of the battery can be further reduced.

(6) A plurality of storage devices are provided and the storage devices are arrayed so as to provide redundancy. More specifically, by applying the storage unit to the RAID system in which a plurality of storage devices are arrayed so as to provide redundancy, the stable feeding to the memory can be achieved not only in the normal operation mode of the cache memory but also in the backup operation mode in the blackout. Therefore, it is possible to establish the RAID system with high reliability of the data storage.

More concretely, in the present invention, the power source used only in the memory normal operation mode and the power source used only in the memory backup operation mode are provided, and the output terminals of them are connected in common, wherein the respective power sources are switched during the feeding depending on the operation mode of the cache memory. In this switching of the power sources, the voltage is controlled so that the output voltage of the selected power source can be relatively higher than that of the other power source. By so doing, it is possible to prevent the stop of the operation of the selected power source. Therefore, the switching method of the feeding paths capable of avoiding the prebias phenomenon can be achieved with using the low-cost normal power source and without using the diode OR circuit.

The typical ones of the inventions disclosed in this application will be briefly described as follows.

According to the present invention, it is possible to supply the power from the optimum power source depending on the operation mode of the cache memory and also to achieve the stable switching of the feeding paths. In addition, it is possible to achieve the feeding operation with high voltage accuracy and small voltage variation.

DESCRIPTION OF THE PREFERRED EMBODIMENTS

Hereinafter, embodiments of the present invention will be described in detail with reference to the accompanying drawings. Note that components having the same function are denoted by the same reference symbols throughout the drawings for describing the embodiments, and the repetitive description thereof will be omitted.

(Comparison Example to the Embodiment)

Figure 7:
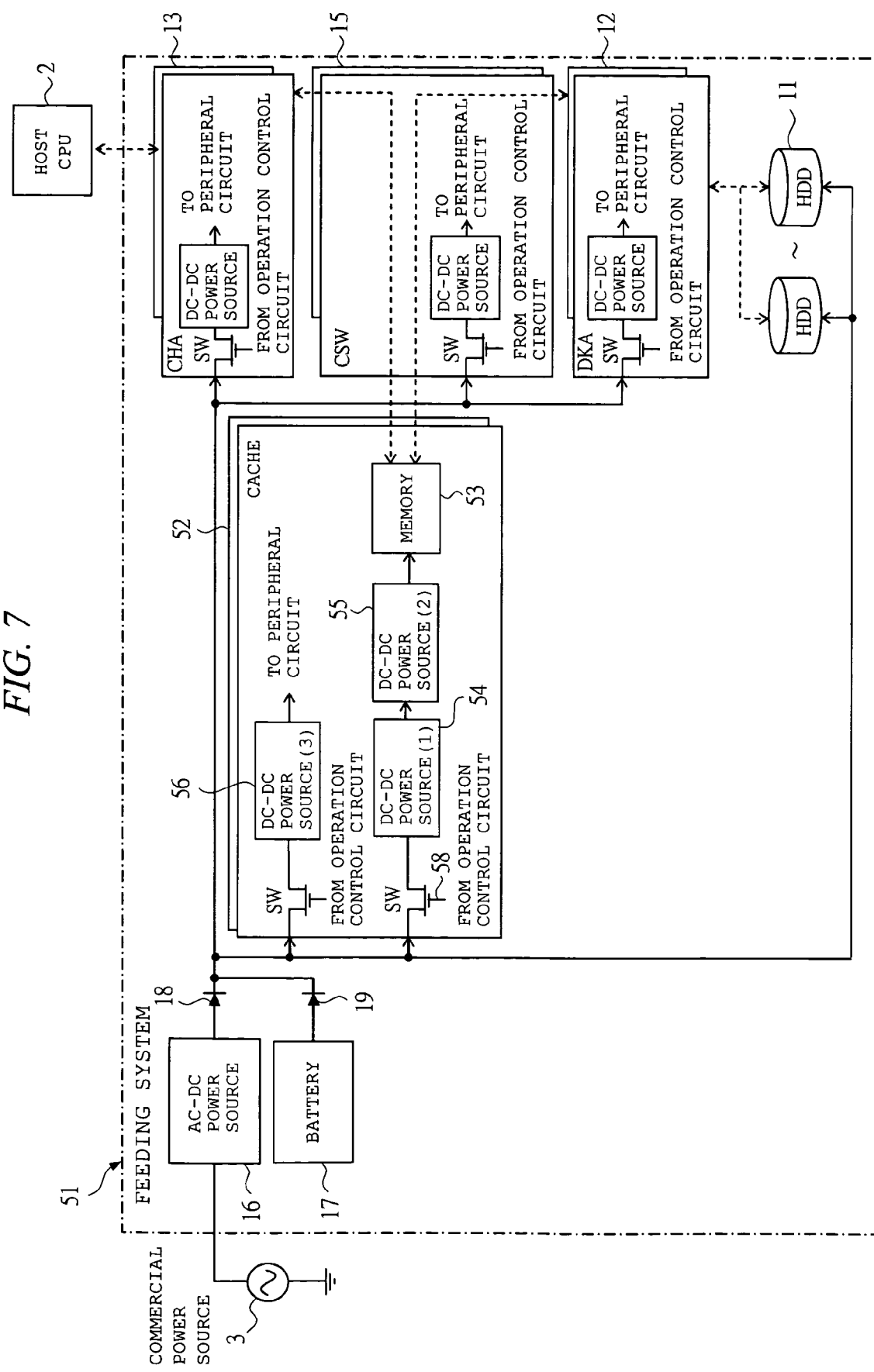
FIG. 7 is a block diagram showing a feeding system in a RAID system in a comparison example relative to an embodiment of the present invention.

First, the configuration of the feeding system in the RAID system in the comparison example relative to the embodiment in which the storage unit according to the present invention is applied will be described with reference to FIG. 7. FIG. 7 is a block diagram showing the feeding system in the RAID system in the comparison example relative to the embodiment of the present invention.

As described above, in the case where there is the possibility of exceeding the endurance limit for blackout when the data storage process is repeatedly performed due to the failure of the hard disk drive during the destaging process, it is necessary to switch the destaging process to the data backup process of the cache memory. Therefore, the feeding system in the RAID system in the comparison example relative to the embodiment of the present invention is a feeding system depending on such a case.

More specifically, as shown in FIG. 7, a feeding system 51 in the RAID system in the comparison example relative to the embodiment of the present invention is connected to a host CPU 2 and a commercial power source 3 and is composed of: a cache memory (CACHE) 52; a hard disk drive (HDD) 11; a disk adapter (DKA) 12; a channel adaptor (CHA) 13; a cache switch (CSW) 15; an AC-DC power source 16; and a battery 17, etc. The cache memory 52 is provided with a memory 53, DC-DC power sources (1) 54 to (3) 56 and switches 57 and 58, etc.

When the commercial power source 3 breaks down and the output voltage of the AC-DC power source 16 starts to decrease in this feeding system 51 configured as described above, the feeding from the battery 17 having a redundant connection to the AC-DC power source 16 is started. Then, after the feeding voltage is reduced to, for example, 54 V or lower, the monitoring is performed for a certain time and the destaging is started. After the disconnection of the host CPU 2 by the channel adaptor 13, the data in the memory (DRAM) 53 on the cache memory 52 is written to the hard disk drive 11, and then the destaging process is finished. In the series of the destaging process, each package such as the disk adaptor 12, the channel adaptor 13, and the cache switch 15 is sequentially switched off and disconnected from the feeding path at the time when their own processes are finished in order to save the standby power, and, finally, only the cache memory 52 is left on the feeding path. After the destaging process, the data backup of the cache memory 52 is performed.

For example, in the feeding system in the RAID system, the high feeding voltage is advantageous in view of the loss (copper loss) of the feeding current in the feeding path. Therefore, the 48V typical feeding system in a communication device is used. A range of the minimum to maximum voltage to be received is set to 36 to 60V, and the output of the AC-DC power source is set to 56V and the battery voltage is set to 54V based on the examination of various aspects such as the maximum charging voltage of the battery. However, this is merely an example.

Note that the switches in each package such as the disk adaptor 12, the channel adaptor 13, and the cache switch 15 are switches for slow start at the time of hot swap and are also used in the disconnection of each package during the above-mentioned destaging process. However, the switch on the feeding path to the memory 53 in the package of the cache memory 52 is not turned off in order to perform the memory backup.

However, the feeding system 51 in the RAID system in the comparison example relative to an embodiment of the present invention has the problems as follows.

(1) Problem of the Feeding System in the Backup Mode of the Memory

Figure 9:
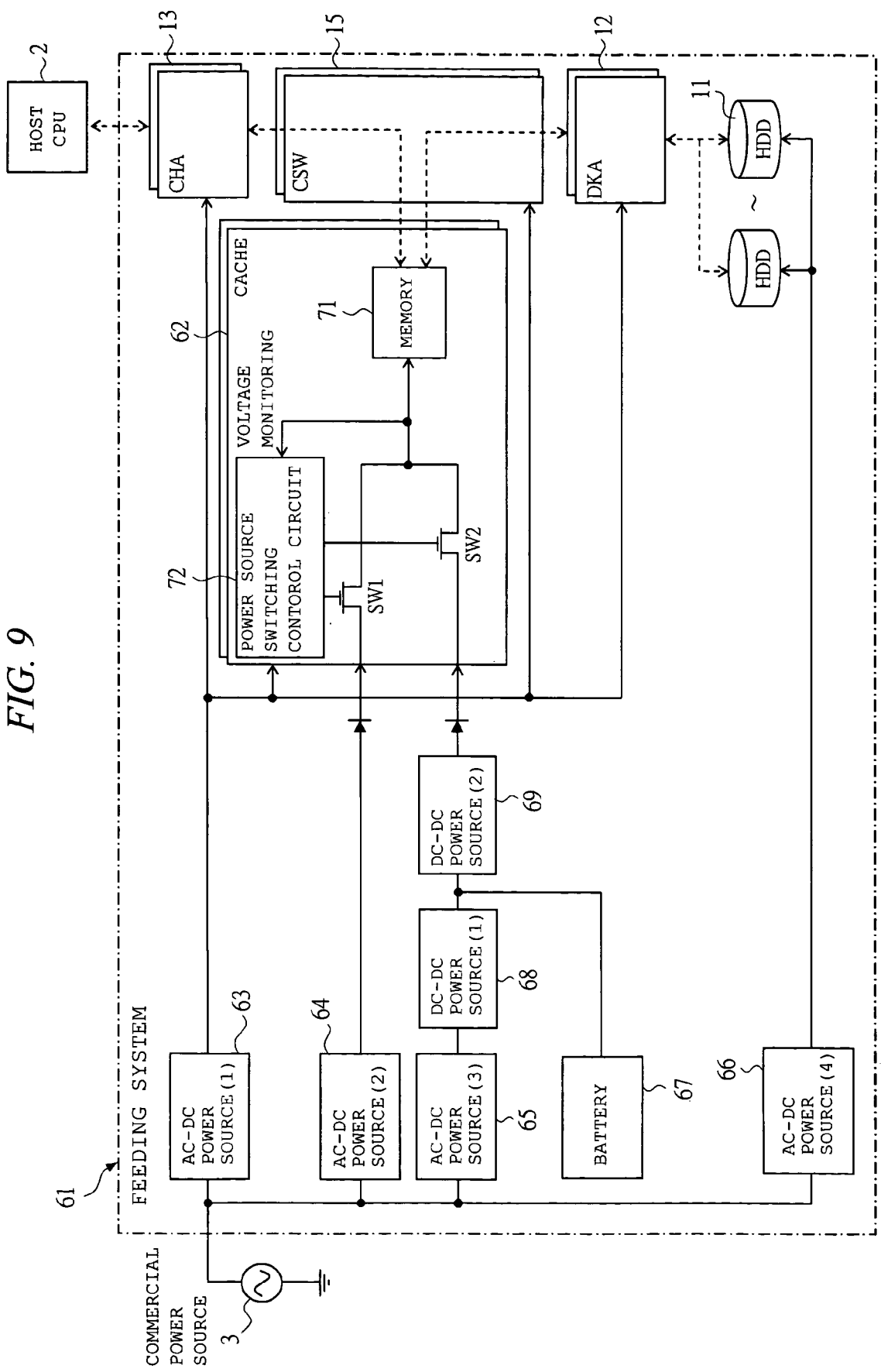
FIG. 9 is a block diagram showing the feeding system in the conventional RAID system examined by the inventor.

In the conventional feeding system (FIG. 9) in the RAID system, when the blackout occurs, the feeding is continued only to the cache memory by using the battery. However, in the feeding system 51 in the RAID system in the comparison example relative to the embodiment of the present invention, when the blackout occurs, the whole RAID system is supported by the feeding from the battery 17 for the time necessary for the destaging process, and then the data backup of the cache memory 52 is performed. Therefore, a nickel hydrogen battery that is excellent in the feeding ability and is compact is selected as the battery 17. However, since the cost and the space to mount the battery are limited, the high power efficiency characteristics are required in the feeding system 51 in addition to the reduction of the load power consumption.

Particularly in the DC-DC power source (1) 54 and the DC-DC power source (2) 55 used in the power source of the cache memory 52, the high power efficiency is required not only when the large current is supplied in the normal operation mode but also when the small current is supplied in the backup operation mode. This is because the large battery power in the limited battery capacity is used in the destaging process and the data backup of the cache memory 52 must be performed for a long time (for example, 24 hours) with the rest of the battery capacity.

(2) Problem in the Feeding System in the Normal Operation Mode of the Memory

Assuming that a DDR memory (a type of DRAM called a dual data rate memory) with a high transfer rate is used as the memory 53 in the cache memory 52 in the feeding system 51 in the RAID system in the comparison example relative to the embodiment of the present invention, the operational voltage range of the DDR memory is 2.5 V±8%, and the highly accurate feeding is required in comparison to the conventionally used memory. Also, since the cache memory 52 is added more as occasion demands, the feeding system with good load regulation in the wide range from small current to large current is needed in the feeding to the memory.

Figure 8A:
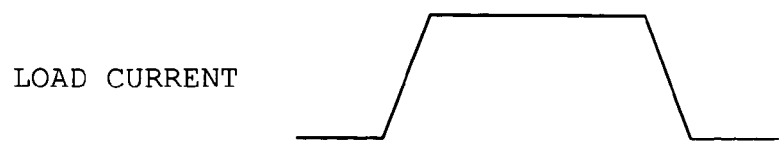
FIG. 8A is a waveform chart showing the relationship of the output voltage to the load current of the DC-DC power source in a feeding system in a comparison example relative to an embodiment of the present invention.
Figure 8B:
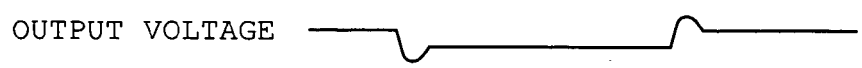
FIG. 8B is a waveform chart showing the relationship of the output voltage to the load current of the DC-DC power source in a feeding system in a comparison example relative to an embodiment of the present invention.
Figure 8C:
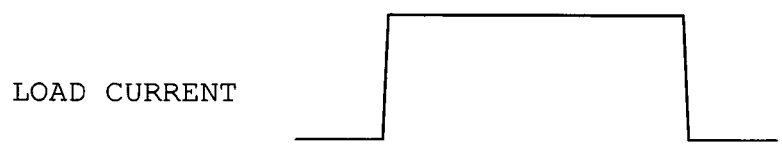
FIG. 8C is a waveform chart showing the relationship of the output voltage to the load current of the DC-DC power source in a feeding system in a comparison example relative to an embodiment of the present invention.
Figure 8D:
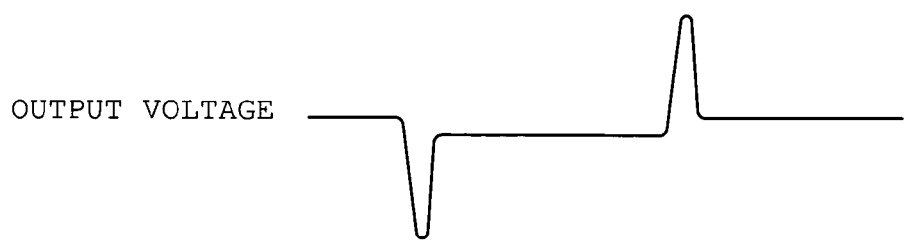
FIG. 8D is a waveform chart showing the relationship of the output voltage to the load current of the DC-DC power source in a feeding system in a comparison example relative to an embodiment of the present invention.
Figure 8E:
FIG. 8E is a waveform chart showing the relationship of the output voltage to the load current of the DC-DC power source in a feeding system in a comparison example relative to an embodiment of the present invention.

Furthermore, in the case of the intensive refresh operation of the memory 53, the transitional current consumption is largely changed. Since this transitional current is changed with a high through rate (sharp gradient), the DC-DC power source (2) 55 used in the feeding to the memory is required to have the characteristics and ability of the small variation in the output voltage depending on the change of the high through rate of the large current in the normal operation mode of the memory 53. For example, as shown in FIG. 8, in the normal operation, the gradient of the load current is moderate as shown in FIG. 8A, and the variation of the output voltage is small as shown in FIG. 8B. Also, in the intensive refresh operation, the gradient of the load current is sharp as shown in FIG. 8C and the variation of the output voltage is large as shown in FIG. 8D. However, the power source used here is required to have a small variation in the output voltage as shown in FIG. 8E in spite of the sharp gradient of the load current.

More specifically, the feeding system 51 in the RAID system in the comparison example relative to an embodiment of the present invention has the problems as follows.

In the feeding system 51 in the RAID system in the comparison example shown in FIG. 7 relative to the embodiment of the present invention, the DC-DC power source (1) 54 and the DC-DC power source (2) 55 are connected in series, and a fast-response DC-DC converter is used as the method for solving the above-mentioned problem (1). This fast-response DC-DC converter is the power source also used as a microprocessor, and has good characteristics in that the voltage variation due to the transient load change is small. However, since it is the 12V input architecture, the DC-DC power source (1) 54 to temporarily convert to 12V is required in the case of the 56V input architecture like this application as shown in FIG. 7.

However, since the DC-DC converter of the DC-DC power source (1) 54 has such fixed loss as to be consumed by its own control circuit, the power efficiency is reduced in the memory backup operation in the small current area. Furthermore, since the series connection of the two stages of DC-DC converters is indispensable to solve the above-mentioned problem (2), the configuration of the feeding system 51 in FIG. 7 has the problem of the low power efficiency.

Meanwhile, the feeding to the memory, in which the DC-DC power source (2) 55 in FIG. 7 is removed and the input of the DC-DC power source (1) 54 is set to 2.5V, more specifically, the feeding method in which the DC-DC power sources are not connected in series, is also examined as the method for solving the problem (1) concerning the power efficiency. However, the fast-response DC-DC converter cannot be used in this feeding method due to the limitation from the input voltage. Also, as a measure to cope with the problem (2), capacitors are added more to the output terminal of the DC-DC power source. As a result of the examination of this method, the method is difficult to realize from the viewpoint of the component mounting area and the cost because the aluminum electrolytic capacitor with large capacity (several tens of thousand μF) must be attached.

As described above, in the feeding system 51 in the RAID system in the comparison example shown in FIG. 7 relative to the embodiment of the present invention, the voltage stability required in the normal operation mode of the cache memory 52 and the high power efficiency required in the backup operation mode are not achieved simultaneously. Therefore, the method, in which the power source dedicated to the normal operation mode and the power source dedicated to the backup operation mode are provided and the feeding paths are switched depending on the operation mode of the cache memory, is invented as a method to solve the problem.

In this method of switching the feeding paths, the use of a diode OR circuit and the application thereof are common in the feeding system (FIG. 9) in the conventional RAID system. However, since the high voltage accuracy is required in the feeding to the DDR memory as mentioned above in the problem (2), the diode OR circuit is not preferable because the voltage accuracy is lost by the reduced load regulation and the increase of the transient load change due to the voltage drop (VF) caused by the current passing through the diode itself.

However, in the case where the two output terminals of the power sources are connected in common without using the connection as made in the diode OR circuit, the output voltage becomes unstable in some cases usually due to the prebias phenomenon of the power source. Therefore, the means to solve this problem is necessary. More specifically, the power source usually controls its own output voltage to be uniform by the feedback control of the output terminal voltage. However, in an application in which the voltage is applied from the outside to the output terminals of the power source, for example, in the case where a plurality of output terminals of the power sources are connected in common, the phenomenon that the voltage control of the power source is stopped (switching stop) occurs. This is generally called a prebias phenomenon.

When the power source in which the voltage control is stopped due to the prebias phenomenon is shifted to the operation state, a trouble such as the output voltage drop occurs because of the response delay of the voltage control. Note that it is true that although there is a special power source capable of preventing the prebias phenomenon, such a power source is less common.

Therefore, the feeding system in the RAID system according to the embodiment of the present invention provides a system configuration for solving the problems of the above-mentioned feeding system 51 in the RAID system in the comparison example relative to the embodiment of the present invention. In this system configuration, the switching method of the feeding paths capable of preventing the prebias phenomenon with using the low-cost normal power source can be realized without using a diode OR circuit, and the feeding path dedicated to the normal operation mode of the cache memory and the feeding path dedicated to the backup operation mode of the cache memory are switched, whereby the feeding can be achieved.

The feeding system in the RAID system according the embodiments of the present invention will be described in detail.

First Embodiment

Figure 1:
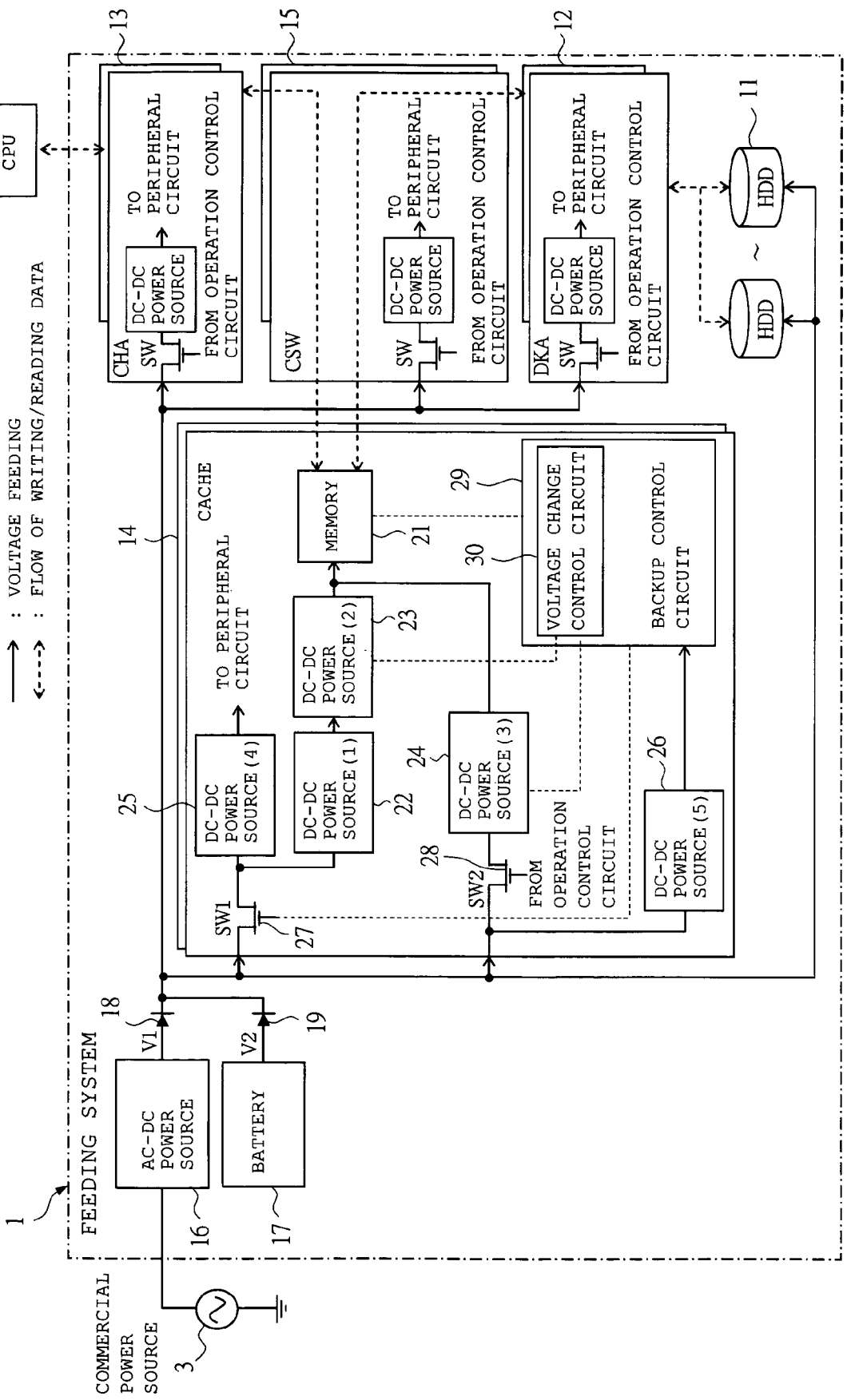
FIG. 1 is a block diagram showing a feeding system in a RAID system according to a first embodiment of the present invention.
Figure 2:
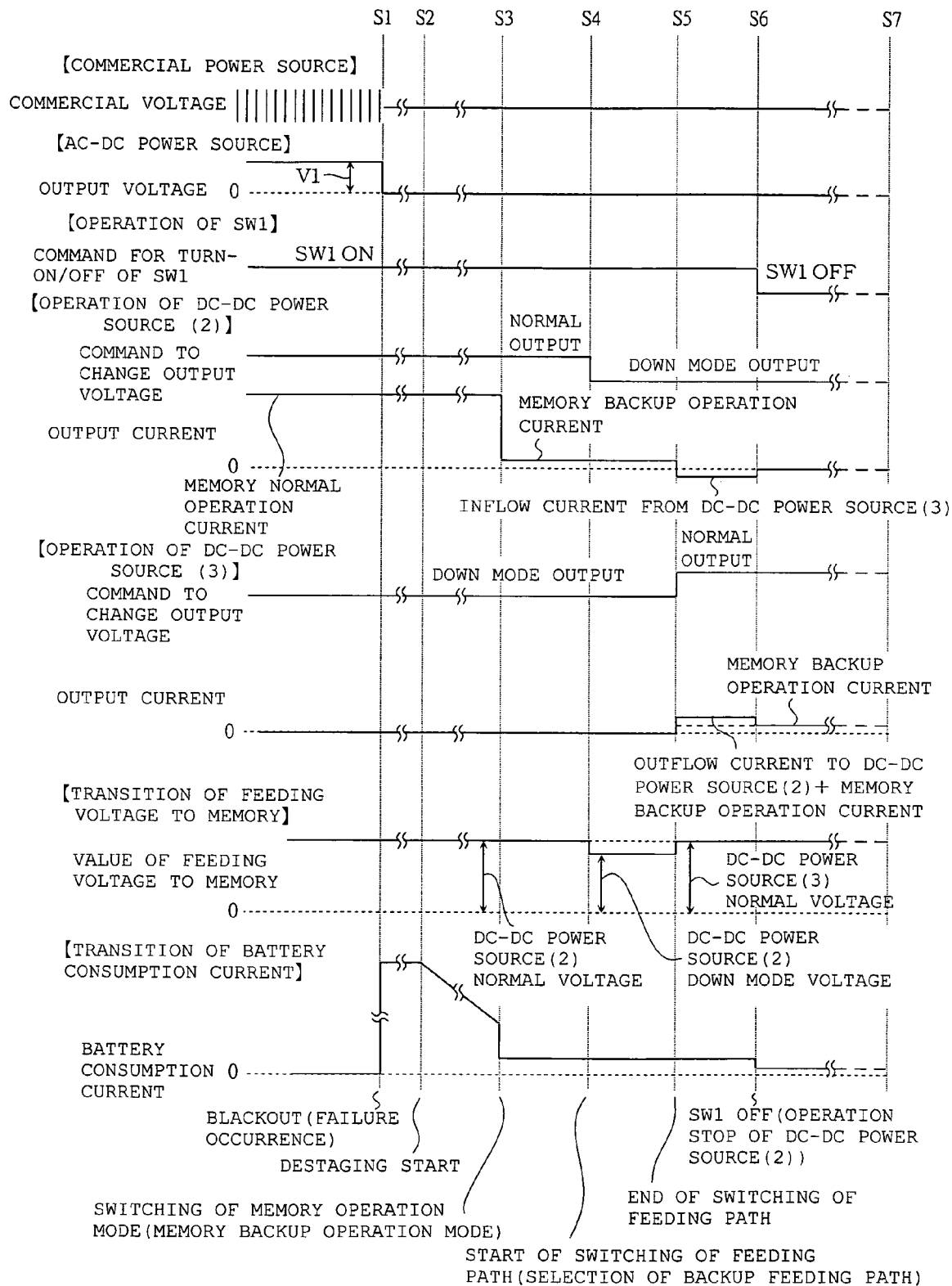
FIG. 2 is a timing chart showing operations of the feeding system in the RAID system according to the first embodiment of the present invention.
Figure 3:
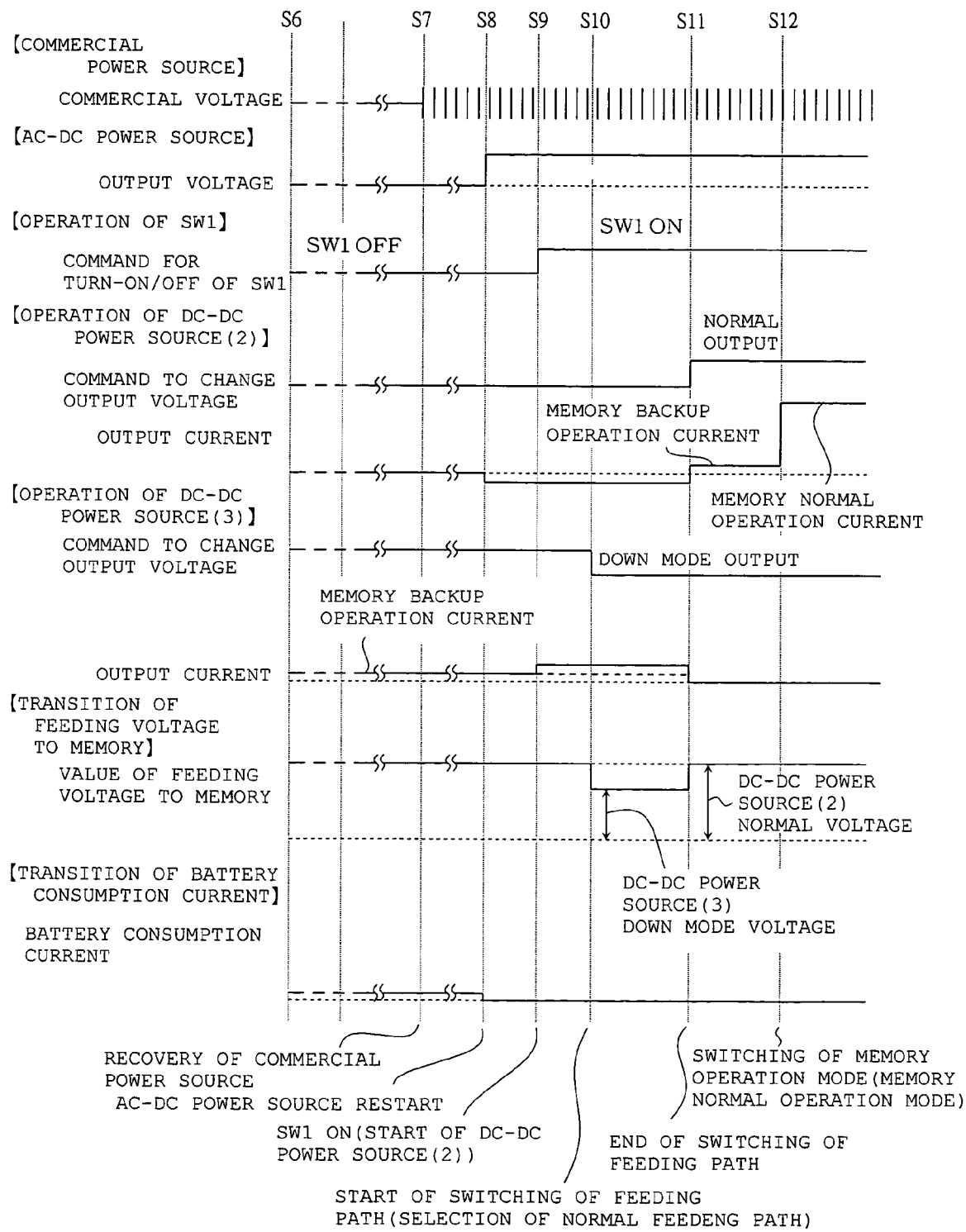
FIG. 3 is a timing chart (subsequent to FIG. 2) showing operations of the feeding system in the RAID system according to the first embodiment of the present invention.

An example of the configuration and operation of the feeding system in the RAID system according to the first embodiment to which a storage unit of the present invention is applied will be described with reference to FIGS. 1 to 3. FIG. 1 is a block diagram showing the feeding system in the RAID system according to the first embodiment. FIGS. 2 and 3 are timing charts showing the operations of the feeding system in the RAID system according to the first embodiment.

First, the configuration of the feeding system in the RAID system according to the first embodiment will be described with reference to FIG. 1.

A feeding system 1 in the RAID system according to the first embodiment connected to a host CPU (host machine) 2 and a commercial power source 3 and is composed of: a plurality of hard disk drives (HDD; storage device) 11 for storing data; a disk adaptor (DKA; storage device control section) 12 to control the writing/reading of data to/from the hard disk drive 11; a channel adaptor (CHA; channel control section) 13 to control the interface with the host CPU 2; a cache memory (CACHE) 14 to temporarily store the data written/read between the host CPU 2 and the hard disk drive 11; a cache switch (CSW) 15 to switch the writing/reading of the data to/from the cache memory 14; an AC-DC power source 16; a battery 17; and the like.

In the voltage feeding path in this feeding system 1, the external commercial power source 3 is connected to the input terminal of the AC-DC power source 16, and the output terminal of the AC-DC power source 16 is connected via a diode 18 to each of receiving terminals of the hard disk drive 11, the disk adaptor 12, the channel adaptor 13, the cache memory 14, and the cache switch 15. Also, the output terminal of the battery 17 is connected in common via a diode 19 to a cathode side of the diode 18. The inside of the cache memory will be described later.

Also, in the flow path of the writing/reading data in this feeding system 1, the input/output terminal of the external host CPU 2 is connected to the input/output terminal of the channel adaptor 13, the input/output terminal of this channel adaptor 13 is connected to the input/output terminal of the cache memory 14 (memory 21) via the input/output terminal of the cache switch 15. In addition, the input/output terminal of the cache memory 14 (memory 21) is connected to the input/output terminal of the disk adaptor 12 via the input/output terminal of the cache switch 15, and the input/output terminal of the disk adaptor 12 is connected to the input/output terminal of the hard disk drive 11.

In the cache memory 14, a DC-DC power source (1) 22 to convert the DC voltage to a predetermined DC voltage, a DC-DC power source (2) (first power source) 23, a DC-DC power source (3) (second power source) 24, a DC-DC power source (4) 25, a DC-DC power source (5) 26, a switch (SW1) (first connection means) 27 to turn on/off the feeding path, a switch (SW2) 28, and a backup control circuit (control means) 29 to control the operation of these DC-DC power sources 22 to 26 and the turn-on/off of the switches 27 and 28 are provided in addition to the memory (DRAM) 21 to temporarily store the data. In this backup control circuit 29, a voltage change control circuit 30 to send the command to change the voltages of the DC-DC power sources (2) 23 and (3) 24 to the minus side is provided.

In the voltage supply path in this cache memory 14, a common connection node on the cathode sides of the diodes 18 and 19 each connected to the AC-DC power source 16 and the battery 17 is connected to the switches 27 and 28, respectively. The one switch 27 is connected in parallel to the input terminals of the DC-DC power source (1) 22 and the DC-DC power source (4) 25, and the output terminal of the one DC-DC power source (1) 22 is connected to the input terminal of the DC-DC power source (2) 23. Also, the output terminal of the DC-DC power source (2) 23 is connected to the memory 21, and a predetermined voltage is supplied to the memory 21. The predetermined voltage from the other DC-DC power source (4) 25 is supplied to the peripheral circuit. The other switch 28 is connected to the input terminal of the DC-DC power source (3) 24, and the output terminal of the DC-DC power source (3) 24 is connected to the memory 21, whereby the predetermined voltage is supplied to the memory 21. In addition, a predetermined voltage from the DC-DC power source (5) 26 connected to an input side of the switch 28 is supplied to the backup control circuit 29.

The DC-DC power source (2) 23 of the DC-DC power sources (1) 22 to (5) 26 is power source for supplying, to the memory 21, the voltage of the normal operation mode, in which the data is written/read to/from the memory 21, that is, power source dedicated to the memory normal operation mode, and the fast-response DC-DC converter depending on the transient load change of the large current and the high through rate is used as the DC-DC power source (2) 23. Also, the DC-DC power source (3) 24 is power source to supply, to the memory 21, the voltage of the backup operation mode, in which the data stored in the memory 21 is retained, that is, power source dedicated to the memory backup operation mode, and the highly power-efficient DC-DC converter is used as the DC-DC power source (3) 24 so as to meet the low current consumption at the time of data backup.

Furthermore, the DC-DC power source (2) 23 and the DC-DC power source (3) 24 have the function to allow each of their output voltages to be changed from a normal output voltage to a lower voltage than the normal voltage in response to the command from the voltage change control circuit 30 in the backup control circuit 29 placed outside the power source (function of a down mode voltage). The respective output voltages of the DC-DC power sources (2) 23 and (3) 24 at the time of the normal output may be set to the same value. Meanwhile, at the time of the "down mode voltage" of the respective output voltages, the output voltage of the DC-DC power source (2) 23 at the down mode may be set so that it can be relatively higher than that of the DC-DC power source (3) 24 at the down mode. Also, when the memory 21 is operated in the normal operation mode, the output voltage of the DC-DC power source (3) 24 is set to a side of the "down mode". Note that the voltage values of the DC-DC power sources (2) 23 and (3) 24 at the down mode are set within a guaranteed operational range of the memory 21. With respect to an operation of the voltage change described above, since the DC-DC converter is usually provided with a terminal dedicated to vertical regulation of the output voltage, the function to vertically regulate the output voltage can be achieved with the simple configuration by utilizing this terminal.

The switches 27 and 28 in the cache memory 14 are power-on switches (with slow start function) used in maintaining the hot swapping of the packages of the cache memory 14 to the feeding system 1. However, the switch 27 connected to the input sides of the DC-DC power sources (1) 22 and (2) 23 is also used as a switch to disconnect standby power from the feeding path for the power save. Note that these switches 27 and 28 are controlled by the backup control circuit 29 in the backup operation mode. However, they are controlled by the operation control circuit (not shown) in the normal operation mode.

In addition, also in each of such packages as the disk adaptor 12, the channel adaptor 13, and the cache switch 15, etc., which constitute the feeding system 1, the power-on switch (SW: with slow start function) used in maintaining the hot swapping to the feeding system 1 is connected to the input sides thereof and the voltage converted to the necessary one through the DC-DC power source mounted in each of the packages is supplied to the peripheral circuit. Also in the packages, the switches are controlled by the operation control circuit (not shown) in the package in the normal operation mode and the backup operation mode.

In the feeding system 1 as described above, the alternating voltage of, for example, 200V is supplied from the commercial power source, and the voltage is converted to the direct voltage of 56V by the AC-DC power source 16. Also, the direct voltage of 54V is supplied from the battery 17. The output voltage of the AC-DC power source 16 or the battery 17 is supplied via the diode 18 or 19 to the hard disk drive 11, the disk adaptor 12, the channel adaptor 13, the cache memory 14, and the cache switch 15.

Then, the output voltage of the AC-DC power source 16 or the battery 17 supplied to the cache memory 14 is supplied via the switch 27 to the DC-DC power source (1) 22, and the voltage is converted to the voltage of 12V by the DC-DC power source (1) 22. Furthermore, the output voltage of the DC-DC power source (1) 22 is supplied to the DC-DC power source (2) 23 and converted to the voltage of 2.5V by this DC-DC power source (2) 23 and then supplied to the memory 21. Also, the output voltage of the AC-DC power source 16 or the battery 17 supplied to the cache memory 14 is supplied to the DC-DC power source (3) 24 via the switch 28 through another path, and the voltage is converted to the voltage of 2.5V by this DC-DC power source (3) 24 and supplied to the memory 21. The voltage supplied to the memory 21 can be variously altered. For example, the output voltage of the DC-DC power source (2) 23 at the down mode can be set to 2.5V−3% and the output voltage of the DC-DC power source (3) 24 changed at the down mode can be set to 2.5V–5%.

Also, in the cache memory 14, the voltage supplied via the switch 27 to the DC-DC power source (4) 25 is converted to the voltage of 12V by the DC-DC power source (4) 25 and supplied to the internal peripheral circuit. In addition, the voltage supplied to the DC-DC power source (5) 26 is converted to the voltage of 3.3V by this DC-DC power source (5) 26 and supplied to the backup control circuit 29.

Next, the operation of the feeding system in the RAID system according to this embodiment will be described with reference to FIGS. 2 and 3. Note that FIG. 2 is a timing chart of states S1 to S6, and FIG. 3 is a timing chart of states S7 to S12 subsequent to FIG. 2.

First, when the commercial power source 3 of the feeding system 1 breaks down and failures occur, the output voltage (V1) of the AC-DC power source 16 is reduced and the power source from the battery 17 having a redundant connection to the AC-DC power source 16 is started in this RAID system. When the feeding voltage becomes lower than the voltage (V2) of the battery 17, the state monitoring is performed for a certain time to check the state of the blackout, and then the destaging process is started (States S1 to S2). At this time, if the feeding voltage recovers up to a value of the output voltage of the AC-DC power source 16 in a predetermined time, the destaging process is not started. This destaging process is a process for storing, to the hard disk drive 11, the data in the cache memory 14 even in the case of the blackout.

Furthermore, after the destaging process is started and the channel adaptor 13 disconnects the host CPU 2, the data in the memory 21 in the cache memory 14 is stored in the hard disk drive 11, and then the destaging process is finished. During this destaging process, the packages such as the disk adaptor 12, the channel adaptor 13, and the cache switch 15 sequentially turn off their own switches at the time when their own processes are finished so as to save the standby power, whereby the packages are disconnected from the feeding path. Finally, only the cache memory 14 is left on the feeding path. After the destaging process, the operation mode of the cache memory 14 is switched to the backup operation mode (State S3). This backup operation mode is a mode to retain the data even in the case of the blackout by continuing the feeding from the battery 17 so as not to volatilize the data in the memory 21 in the cache memory 14.

Meanwhile, when the power is supplied into the memory 21 in the cache memory 14, the output voltage of the DC-DC power source (2) 23 is set to the normal output voltage. On the other hand, the output voltage of the DC-DC power source (3) 24 is placed on a side of a minus change (a down mode). Therefore, the power is supplied, through the path constituting the DC-DC power source (1) 22 and the DC-DC power source (2) 23, to the memory 21, and even in the state transition from the "blackout occurrence" to the "end of destaging process" to the "switching to memory backup operation mode", the feeding is continued through the path of the DC-DC power source (2) 23 dedicated to the memory normal operation mode (states S1 to S3). At this time, the switching operation of the DC-DC power source (3) 24 is stopped due to the prebias phenomenon. This prebias phenomenon is a phenomenon in which the voltage control for controlling its own output voltage to be uniform by the feedback control of the voltage of the output terminal is stopped (switching stop) in the application that the voltage is applied from the outside to the output terminal of the power source.

Then, after the end of the switching to the backup operation mode of the cache memory 14, the switching operation to the feeding path of the DC-DC power source (3) 24 dedicated to the memory backup operation mode is started. The process of the switching operation to the feeding path of the DC-DC power source (3) 24 will be described below.

First, as an initial step, the setting of the output voltage of the DC-DC power source (2) 23 is shifted from the normal output condition to the down mode condition, and the setting value of the output voltage is lowered. However, since the setting of the output voltage of the DC-DC power source (2) 23 is higher than that of the DC-DC power source (3) 24, the feeding to the memory 21 is continued from the DC-DC power source (2) 23 and the feeding voltage of the memory 21 becomes a voltage value of the Dc-DC power source (2) 23 at the down mode (state S4).

Subsequently, the setting of the output voltage of the DC-DC power source (3) 24 is switched from the down mode condition to the normal output condition. By so doing, since a target of the voltage control of the DC-DC power source (3) 24 is set to the value higher than the output voltage setting of the DC-DC power source (2) 23 changed at the down mode, the DC-DC power source (3) 24 is recovered from a switching stop state and the switching is restarted, and the feeding voltage to the memory 21 becomes the normal output voltage of the DC-DC power source (3) 24. At this time, the feeding path is switched from the DC-DC power source (2) 23 to the DC-DC power source (3) 24 dedicated to the memory backup operation mode (State S5). At this time, the leakage current to the DC-DC power source (2) 23 appears in the output current of the DC-DC power source (3) 24.

Finally, the switch 27 on the input side of the DC-DC power source (1) 22 is turned off to cut the unnecessary standby power in the feeding system by the DC-DC power source (2) 23 dedicated to the memory normal operation mode. By so doing, the current consumption of the battery 17 is reduced to the minimum and the switching operation to the backup operation mode is finished (State S6).

Then, the commercial power source 3 is recovered before the consumption power of the battery 17 becomes zero, and the AC-DC power source 16 is restarted. After the restart of the AC-DC power source 16, the switch 27 on the input side of the DC-DC power source (1) 22 is turned on and the DC-DC power source (2) 23 dedicated to the memory normal operation mode is started (States S7 to S9).

Thereafter, the switching operation to the feeding path from the DC-DC power source (2) 23 dedicated to the memory normal operation mode is started by the same process as described above. First, the setting of the output voltage of the DC-DC power source (3) 24 is shifted from the normal output condition to the down mode condition to reduce the setting value of the output voltage, and the feeding to the memory 21 is continued from the DC-DC power source (2) 23. Subsequently, the setting of the output voltage of the DC-DC power source (2) 23 is switched from that changed from the down mode condition to the normal output condition and the feeding path to the memory 21 is switched from the DC-DC power source (3) 24 to the DC-DC power source (2) 23 dedicated to the memory normal operation mode (States S10 to S11).

Furthermore, respective packages such as the disk adaptor 12, the channel adaptor 13, and the cache switch 15 turn on their own switches to be connected to the feeding path, and the operation mode of the cache memory 14 is switched to the memory normal operation mode (State S12).

The basic operation in this memory normal operation mode is as follows. For example, in the basic writing operation, the channel adaptor 13 receives the command from the host CPU 2 and registers the command in a shared memory (not shown). Furthermore, the writing data from the host CPU 2 is stored in the memory 21 in the cache memory 14. Then, when the storage of the writing data is finished, the channel adaptor 13 transmits the completion of the command to the host CPU 2. At this time, the writing data is not yet written in the hard disk drive 11.

Also, the disk adaptor 12 always monitors contents of the shared memory. The disk adaptor 12 having at present no task to the hard disk drive 11 finds the writing command previously registered in the shared memory by the channel adaptor 13, and executes the command. Then, the disk adaptor 12 fetches the writing data from the memory 21 in the cache memory 14 in accordance with the registered content of the shared memory, and writes the data into the hard disk drive 11.

Meanwhile, in a basic reading operation, the channel adaptor 13 receives the command from the host CPU 2 and registers the command to the shared memory. Furthermore, the disk adaptor 12 always monitors the contents of the shared memory. The disk adaptor 12 having at present no task to the hard disk drive 11 finds the reading command previously registered in the shared memory by the channel adaptor 13, and executes the command. Then, the disk adaptor 12 reads the data from the hard disk drive 11 in accordance with the registered contents of the shared memory, and stores the data into the memory 21 in the cache memory 14.

Also, the channel adaptor 13 monitors the shared memory to check whether or not the target data is stored into the memory 21 in the cache memory 14, and fetches the data from the memory 21 in the cache memory to transfer the data to the host CPU 2.

As described above, the writing data from the host CPU 2 is once written in the cache memory 14 and then stored to the hard disk drive 11. At this time, it is unnecessary to immediately write, to the hard disk drive 11, the data stored in the cache memory 14, and the writing process can be done depending on the operational state of the RAID system. Even if the data writing from the cache memory 14 to the hard disk drive 11 is not done, it is possible to access and read the data temporarily stored in the cache memory 14 from the host CPU. Furthermore, since the access speed of the cache memory 14 is faster than that of the hard disk drive 11, the high-speed data is access can be done from the host CPU 2.

In the operation of the feeding system 1 as described above, the time lengths between each of the states are set to, for example, 60 s between S1 and S2, 600s between S2 and S3, 10 ms between S3 and S4, 10 ms between S4 and S5, and 10 ms between S5 and S6, and the period from the state S1 to the state S7 is the blackout time. Also, the time lengths after the recovery from the blackout of the state S7 are set to, for example, 10 s between S7 and S8, 1500 ms between S8 and S9, 300 ms between S9 and S10, 10 ms between S10 and S11, and 10 ms between S11 and S12. As described above, since the series of state transition can be made relatively slowly, the control circuit with high sensitivity is unnecessary.

Therefore, the effects as follows can be achieved in the feeding system 1 according to this embodiment.

(1) The DC-DC power source (2) 23 dedicated to the memory normal operation mode and the DC-DC power source (3) 24 dedicated to the memory backup operation mode are provided so that the DC-DC power source (2) 23 and the DC-DC power source (3) 24 can be switched. The power is supplied from the DC-DC power source (2) 23 in the normal operation mode and the power is supplied from the DC-DC power source (3) 24 in the backup operation mode. Therefore, it is possible to supply the power from the optimum power source depending on the operation mode of the cache memory 14.

(2) The fast-response DC-DC converter is used as the DC-DC power source (2) 23 dedicated to the memory normal operation mode, and the highly power-efficient DC-DC converter is used as the DC-DC power source (3) 24 dedicated to the memory backup operation mode. By so doing, since the power is supplied from the fast-response DC-DC power source (2) 23 in the self refresh in the normal operation mode and in the rapid variation of large current in the intensive refresh, it is possible to stably supply the power to the cache memory 14 with small voltage variation. Also, since the highly power-efficient DC-DC power source (3) 24 is used to supply the power when the small power is supplied in the backup operation mode, the power consumption of the battery 17 can be reduced.

Furthermore, since the fast-response DC-DC power source (2) 23 is used in the normal operation mode, the large-capacity capacitor indispensable in the conventional feeding system becomes unnecessary, whereby the cost reduction can be achieved. In addition, since the power consumption of the battery 17 can be reduced in the backup operation mode, the cost reduction can be achieved from the aspect of the capacity of the battery 17.

(3) In the switching of the feeding path to the memory 21 in the cache memory 14, the output voltage of the DC-DC power source to be selected is intentionally controlled and changed so that it becomes relatively higher than the output voltage of the unselected DC-DC power source, so that the stop of the operation of the DC-DC power source to be selected is prevented. Therefore, the stable switching of the feeding path without the influence of the prebias phenomenon in the selected DC-DC power source can be achieved. More specifically, in the switching from the normal operation mode to the backup operation mode, the output voltage of the DC-DC power source (3) 24 is set higher than the output voltage of the DC-DC power source (2) 23, and in the switching from the backup operation mode to the normal operation mode, the output voltage of the DC-DC power source (2) 23 is set higher than that of the DC-DC power source (3) 24. By so doing, the influence of the prebias phenomenon can be eliminated.

Note that, in this embodiment, the voltage control operation has been described using a method of lowering vales of the output voltages (down mode output variable control). However, in the switching of the feeding path, the stable switching of the feeding path can be achieved also by using a method of increasing values of the output voltages (up mode output variable control) if the relationship between the output voltage of the selected power source and the output voltage of the unselected power source is maintained. More specifically, in the switching from the normal operation mode to the backup operation mode, the output voltage of the DC-DC power source (3) 24 is changed to increase so that it can be higher than the output voltage of the DC-DC power source (2) 23. Also, in the switching from the backup operation mode to the normal operation mode, the output voltage of the DC-DC power source (2) 23 is changed to increase so that it can be higher than the output voltage of the DC-DC power source (3) 24. By so doing, the switching without the influence of the prebias phenomenon can be achieved.

Furthermore, though the feeding voltage is changed by the intentional voltage control to the down mode condition or an up mode condition, the voltage change is extremely small from the viewpoint of the principle of operation. Therefore, the feeding voltage accuracy is greatly improved considering the guaranteed operational voltage range of the memory 21, and it is possible to achieve the feeding with high voltage accuracy and small voltage variation.

(4) When the power is supplied from the DC-DC power source (3) 24 dedicated to the memory backup operation mode, the switch 27 provided on the input side of the DC-DC power source (2) 23 dedicated to the memory normal operation mode is turned off to stop the operation of the DC-DC power source (2) 23. By so doing, it becomes possible to reduce the current consumption of the battery 17 in the backup operation mode, and also to reduce the capacity of the battery 17. More specifically, since it is possible to cut the unnecessary standby power in the feeding system of the DC-DC power source (2) 23 dedicated to the memory normal operation mode, the current consumption of the battery 17 can be reduced and the cost reduction of the battery 17 can be achieved.

Note that the switching for the data backup in the cache memory 14 after the end of the destaging process has been described in this embodiment. However, if a user selects only the data backup of the cache memory 14 not the destaging process as the handling for the data loss, the battery power capacity (number of batteries to be mounted) can be greatly reduced. As described above, if only the data backup of the cache memory 14 is performed, the battery current consumption (battery power capacity) required in the states S1 to S3 in FIGS. 2 and 3 becomes unnecessary, whereby the cost reduction can be achieved.

(5) If the invention is applied to the feeding system in the RAID system, the stable feeding to the memory can be made not only in the normal operation mode of the cache memory 14 but also in the backup operation mode in the blackout. Therefore, the RAID system with the high reliability for the data storage can be established.

Second Embodiment

Figure 4:
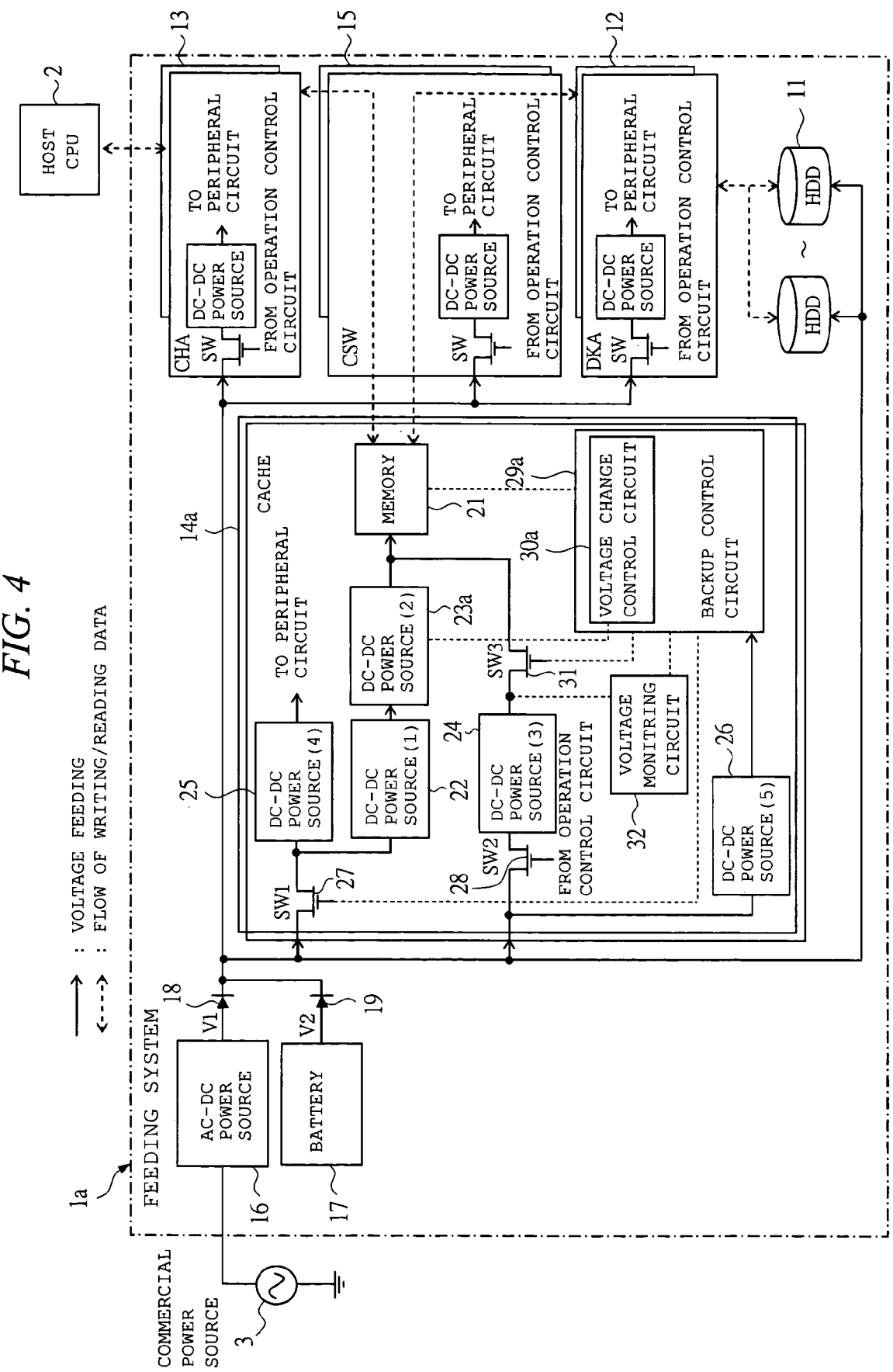
FIG. 4 is a block diagram showing a feeding system in a RAID system according to a second embodiment of the present invention.
Figure 5:
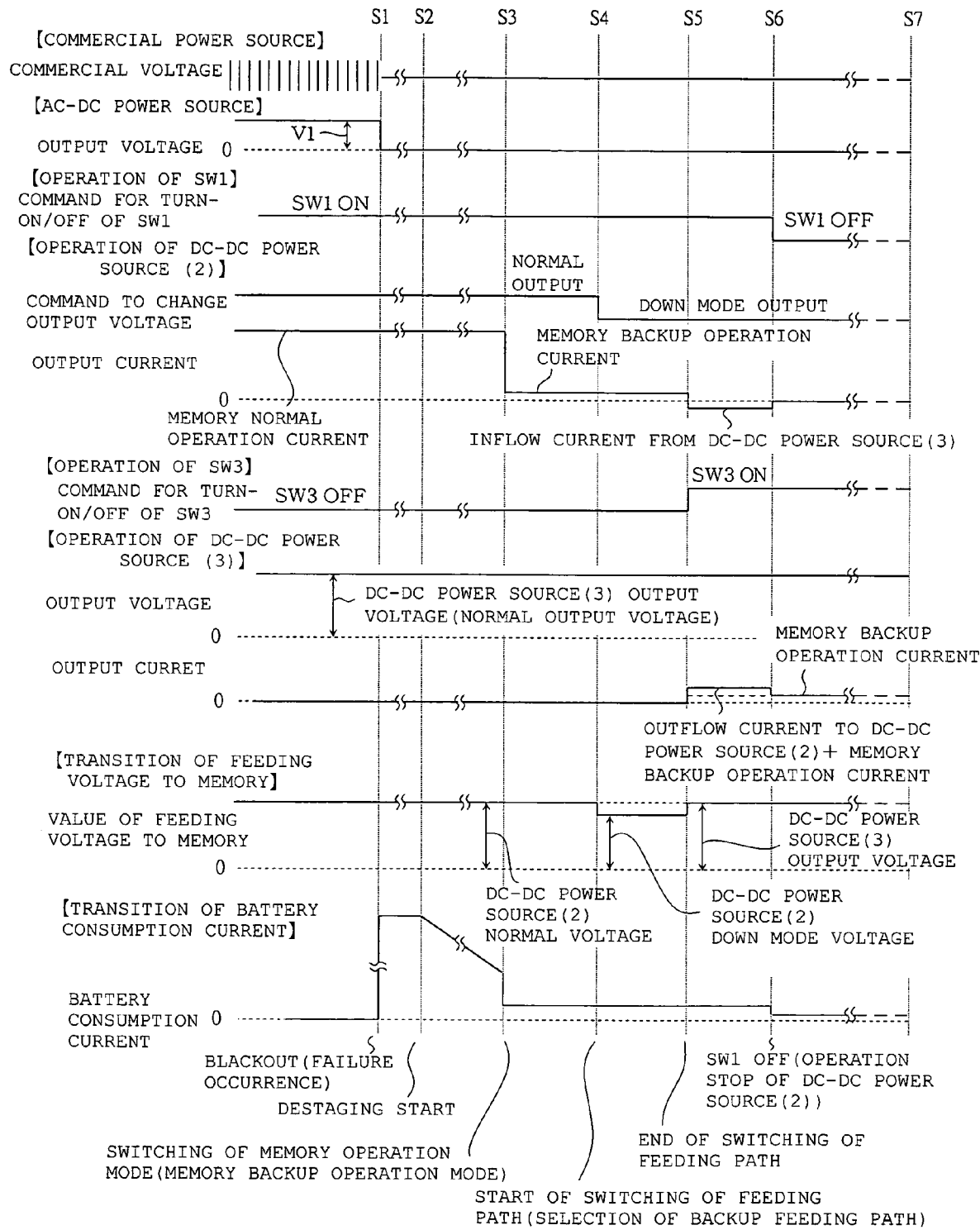
FIG. 5 is a timing chart showing operations of the feeding system in the RAID system according to the second embodiment of the present invention.
Figure 6:
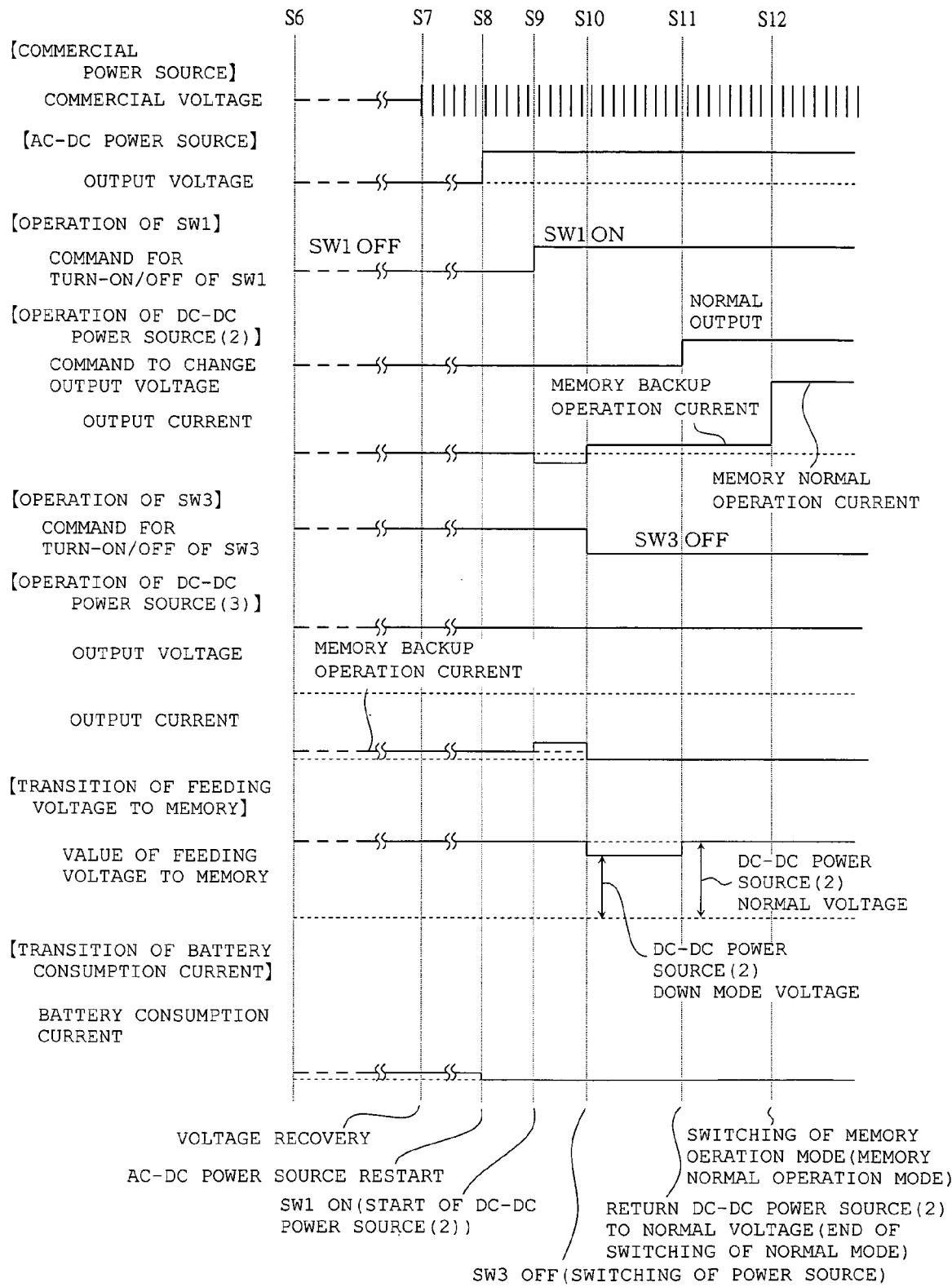
FIG. 6 is a timing chart (subsequent to FIG. 5) showing operations of the feeding system in the RAID system according to the second embodiment of the present invention.

An example of the configuration and operation of a feeding system in a RAID system according to a second embodiment using a storage unit of the present invention will be described with reference to FIGS. 4 to 6. FIG. 4 is a block diagram showing the feeding system in the RAID system according to the second embodiment. FIGS. 5 and 6 are timing charts showing the operation of the feeding system in the RAID system according to the second embodiment.

First, the configuration of the feeding system in the RAID system according to the second embodiment will be described with reference to FIG. 4.

Similarly to the feeding system 1 in the first embodiment, the feeding system 1a in the RAID system according to the second embodiment is connected to a host CPU 2 and a commercial power source 3 and is composed of: a hard disk drive (HDD) 11; a disk adaptor (DKA) 12; a channel adaptor (CHA) 13; a cache memory (CACHE) 14a; a cache switch (CSW) 15; an AC-DC power source 16; a battery 17; and the like. The difference from that in the first embodiment is the configuration in the cache memory 14a.

That is, the cache memory 14a in this embodiment is provided with a switch (SW3) (second connection means) 31 and a voltage monitoring circuit (monitoring means) 32 in addition to the memory (DRAM) 21, the DC-DC power sources (1) 22 and (3) 24 to (5) 26, and the switches (SW1) 27 and (SW2) 28. Also, the DC-DC power source (2) 23a and the backup control circuit 29a having the voltage change control circuit 30a each have a function different from that in the first embodiment.

More specifically, similarly to the first embodiment, the DC-DC power source (2) 23a is a power source dedicated to the memory normal operation mode and a fast-response DC-DC converter which depends on the transient load change of the large current and the high through rate and in which a special architecture causing no prebias phenomenon is further used. In addition, similarly to the first embodiment, the DC-DC power source (3) 24 is, similarly to the first embodiment, a power source dedicated to the memory backup operation mode, and a highly power-efficient DC-DC converter corresponding to the low current consumption at the time of data backup.

Furthermore, only the DC-DC power source (2) 23a has the function, similarly to the first embodiment, to change the voltage to the side of the minus change in accordance to the commands from the voltage change control circuit 31a in the backup control circuit 29a outside the power source. Also, the voltage change function of the DC-DC power source (3) 24 is unnecessary, and the setting of the output voltage of the DC-DC power source (3) 24 may be set to the same as the normal output voltage of the DC-DC power source (2) 23a.

Also, in the cache memory 14a, the switch 31 is provided between the output of the DC-DC power source (3) 24 and the feeding terminal of the memory 21, and this switch 31 is turned on only when the power is supplied from the DC-DC power source (3) 24. The turn-on/off of the switch 31 is controlled by the backup control circuit 29a. Furthermore, the output voltage of the DC-DC power source (3) 24 is monitored by the voltage monitoring circuit 32.

Note that since the other configuration and function are identical to those in the first embodiment, the detail description thereof will be omitted here.

Next, the operation of the feeding system in the RAID system according to this embodiment will be described with reference to FIGS. 5 and 6. Note that FIG. 5 is a timing chart of the states S1 to S6, and FIG. 6 is a timing chart of the states S7 to S12 subsequent to FIG. 5.

In the transition of the operations in this embodiment, the transition from the "occurrence of blackout" to the "switching of memory operation mode" is identical to that of the first embodiment. Therefore, the switching operation of the memory feeding path to the backup operation mode will be described below.

First, in the case where the cache memory 14a is operated in the normal operation mode, the power is supplied to the memory 21 from the DC-DC power source (2) 23a dedicated to the normal operation mode. In this case, though the DC-DC power source (3) 24 is in the operational state, since the switch 31 on the output side of the DC-DC power source (3) 24 is turned off, the feeding from the DC-DC power source (3) 24 is stopped (States S1 to S3).

Subsequently, after changing the setting of the output voltage of the DC-DC power source (2) 23a from the normal output condition to the down mode condition to reduce the values of the feeding voltage to the memory 21, the switch 31 is turned on. At this time, since the output voltage of the DC-DC power source (3) 24 is higher than that of the DC-DC power source (2) 23a changed to the down mode condition, the power to the memory 21 is supplied from the DC-DC power source (3) 24 dedicated to the memory backup operation mode. As a result, the feeding voltage to the memory 21 becomes the output voltage value of the DC-DC power source (3) 24 (States S4 to S5). At this time, in spite of the prebias operation of the DC-DC power source (2) 23a, since the DC-DC power source (2) 23a is a power source with the special architecture, the switching operation (power source voltage control) is not stopped. However, the DC-DC power source (2) 23a is operated in a current absorption mode from the DC-DC power source (3) 24 and turns into a standby state.

Finally, the switch 27 on the input side of the DC-DC power source (1) 22 is turned off to cut the unnecessary standby power in the feeding system by the DC-DC power source (2) 23a dedicated to the memory normal operation mode. By so doing, the current consumption of the battery 17 is reduced to the minimum and the switching operation to the backup operation mode is finished (State S6).

The switching of the feeding path from the backup operation mode to the normal operation mode is done by turning off the switch 31, and finally the output voltage of the DC-DC power source (2) 23a changed to the down mode condition is returned to the normal output condition (States S7 to S12). The other operations are identical to those in the first embodiment.

Therefore, the effect as follows can be achieved in the feeding system 1a according to this embodiment in addition to the effects (1) to (5) in the first embodiment.

(1) to (5) These items are the same as those in the first embodiment.

(6) Since the voltage monitoring circuit 32 for the output voltage of the DC-DC power source (3) 24 dedicated to the memory backup operation mode is provided and the switch 31 is connected to the output of this DC-DC power source (3) 24, when the power is supplied from the DC-DC power source (2) 23a dedicated to the memory normal operation mode, the switch 31 is turned off and the output voltage of the DC-DC power source (3) 24 is monitored by the voltage monitoring circuit 32. Therefore, it is possible to prevent the data loss in the cache memory 14a and to improve the reliability of the data. More specifically, in the normal operation in which the switch 31 is in a turn-off state, the health check of the DC-DC power source (3) 24 can be performed. Therefore, the data lost can be prevented in advance by prohibiting the use of the cache memory 14a, whereby the system with high reliability can be established.

Note that, since the output terminals of the DC-DC power source (2) 23 and the DC-DC power source (3) 24 are always connected in common in the first embodiment, the operation state of the DC-DC power source (3) 24 dedicated to the backup operation mode cannot be checked. However, the operation state can be checked in the configuration with the switch 31 as described in the second embodiment.

In the foregoing, the invention made by the inventor has been concretely described based on the embodiments. However, it is needless to say that the present invention is not limited to the foregoing embodiments and various modifications and alterations can be made without departing from the scope of the present invention.

For example, the data backup of the cache memory 14 has been is described in the first and second embodiments. However, the data backup of the shared memory (not shown) is also possible by using the present invention.

The storage unit according to the present invention can be applied to the RAID system in which storage devices such as hard disk drives are arrayed so as to provide redundancy, and it is suitable to the feeding technique in this RAID system.

What is claimed is:

1. A storage unit, comprising:
a storage device to store data;
a storage device control section to control the writing/reading of the data to/from said storage device,
a channel control section to control an interface with a host machine,
a cache memory to temporarily store the data written/read between said host machine and said storage device;
a first power source to supply, to said cache memory, a voltage in a normal operation mode in which the data is written to/read from said cache memory, and
a second power source to supply, to said cache memory, a voltage in a backup operation mode in which the data stored in said cache memory is retained,
wherein upon occurrence of a failure in said first power source, said storage unit reduces said voltage of said normal operation mode supplied by said first power source to said cache memory, starts a destaging process in which data in said cache memory is stored in said storage device, and switches, after said destaging process has been completed, the operation mode of said cache memory from said normal operation mode to said backup operation mode in which said voltage of said backup mode is supplied by said second power source to said cache memory.

2. The storage unit according to claim 1,
wherein each of said first and second power sources further includes:
a function to change an output voltage of said each first and second power sources in response to a command from outside of said each first and second power sources, and
control means to switch a feeding path of said each first and second power sources to said cache memory,
wherein the control means switches the feeding paths to said cache memory by controlling such a voltage value that an output voltage of one selected from said second and first power sources is set higher than that of the other unselected from said second and first power sources.

3. The storage unit according to claim 2,
wherein said control means changes the output voltage of said first power source from a first voltage value to a second voltage value lower than said first voltage value in switching from said feeding path of said first power source to said feeding path of said second power source.

4. The storage unit according to claim 2,
wherein said control means changes the output voltage of said second power source from a third voltage value to a fourth voltage value lower than said third voltage value in switching from said feeding path of said second power source to said feeding path of said first power source.

5. The storage unit according to claim 2,
wherein said control means changes the output voltage of said second power source from a fifth voltage value to a sixth voltage value lower than said fifth voltage value in switching from said feeding path of said first power source to said feeding path of said second power source.

6. The storage unit according to claim 2,
wherein said control means changes the output voltage of said first power source from a seventh voltage value to an eighth voltage value lower than said seventh voltage value in the switching from said feeding path of said second power source to said feeding path of said first power source.

7. The storage unit according to claim 1, further comprising:
first connection means connected to an input side of said first power source,
wherein said first connection means is turned off when power is supplied from said second power source.

8. The storage unit according to claim 1, further comprising:
second connection means connected between an output terminal of said second power source and a feeding terminal of said cache memory; and
monitoring means to monitor the output voltage of said second power source,
wherein said second connection means is turned off when power is supplied from said first power source and the output voltage of said second power source is monitored by said monitoring means.

9. The storage unit according to claim 1,
wherein said first power source is composed of a fast-response DC-DC converter, and
said second power source is composed of a highly power-efficient DC-DC converter.

10. The storage unit according to claim 1,
wherein a plurality of said storage devices are provided, and said storage devices are arrayed so as to provide redundancy.

* * * * *